US008464276B1

(12) United States Patent
Leonard et al.

(10) Patent No.: US 8,464,276 B1
(45) Date of Patent: Jun. 11, 2013

(54) CHANNEL MONITORING IN A MESSAGING-MIDDLEWARE ENVIRONMENT

(75) Inventors: Mark D. Leonard, Olathe, KS (US); Terriss L. Ford, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 613 days.

(21) Appl. No.: 12/685,383

(22) Filed: Jan. 11, 2010

(51) Int. Cl.
*G06G 3/00* (2006.01)
*G06F 9/44* (2006.01)
*G06F 9/46* (2006.01)
*G06F 13/00* (2006.01)

(52) U.S. Cl.
USPC .......................................... 719/314; 719/313

(58) Field of Classification Search
USPC ................................. 719/314, 313
See application file for complete search history.

(56) References Cited

U.S. PATENT DOCUMENTS

| | | | |
|---|---|---|---|
| 6,182,109 B1 * | 1/2001 | Sharma et al. ................ | 718/104 |
| 7,873,991 B1 * | 1/2011 | Attwood et al. ................ | 726/11 |
| 2002/0064126 A1 * | 5/2002 | Bhattal et al. ................ | 370/217 |
| 2005/0038824 A1 * | 2/2005 | Kenntner et al. ............. | 707/200 |
| 2007/0294708 A1 * | 12/2007 | Kline ............................ | 719/320 |
| 2008/0163249 A1 * | 7/2008 | Garza et al. ................... | 719/314 |

OTHER PUBLICATIONS

Saida Davis and Peter Broadhurst, Redbooks, WebSphere MQ V6 Fundamentals, IBM WebSphere.software, ibm.com/redbooks, 446 pages, First Edition (Nov. 2005). This IBM Redbook edition is an update to the Redpaper MQSeries Primer, REDP-0021. This edition applies to Version 6, Release O, Modification O, of IBM WebSphere MQ (product No. 5724-H72).
Ben Mann, Worldwide Product Manager, Providing a backbone for connectivity with SOA Messaging, IBM WebSphere.software, Service oriented architecture solutions, White paper, Updated: Jun. 2009, 32 pages, ibm.com/webspheremq, Copyright IBM Corporation 2009, Produced in the United States of America Mar. 2007.

* cited by examiner

*Primary Examiner* — Emerson Puente
*Assistant Examiner* — Willy W Huaracha

(57) ABSTRACT

A method, system, and medium are provided for monitoring channels running on a queue manager. Both the total number of channel instances and instances of each named channel running on a queue manager may be monitored. An alarm may be generated when the total number of channel instances exceeds a threshold value. An alarm may also be generated when the instances of a particular named channel exceed a threshold value for the particular named channel.

18 Claims, 5 Drawing Sheets

CHANNEL MONITORING IN A MESSAGING-MIDDLEWARE ENVIRONMENT

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon for performing a method of automatically monitoring channels running on a queue manager are provided. The method includes retrieving data describing channel instances currently running on the queue manager and determining a total number of channel instances currently running on the queue manager. The method also includes determining that the total number of channel instances is above a total instance threshold for the queue manager. The method further includes communicating an alarm message indicating that the total number of channel instances for the queue manager is above the total instance threshold for the queue manager.

In another illustrative embodiment, one or more computer-readable media having computer-executable instructions embodied thereon for performing a method of automatically monitoring channel instances running on a queue manager is provided. The method comprising retrieving data describing channel instances currently running on the queue manager. The method further comprising determining how many instances of a specific channel are running on the queue manager and determining that a total number of specific channel instances are above an individual threshold for the specific channel. The method also including communicating an alarm message indicating that the total number of specific channel instances is above the individual threshold for the specific channel.

In a third illustrative embodiment, a method of automatically monitoring channels running on a queue manager is provided. The method including retrieving a total number of channel instances currently running on the queue manager. The method includes determining a total channel threshold that is calculated by multiplying a maximum number of channels the queue manager is configured to run by a percentage of the maximum number of channels. The method also includes determining that the total number of channel instances is above the total instance threshold for the queue manager. The method further includes communicating an alarm message indicating that the total number of channel instances for the queue manager is above the total instance threshold for the queue manager.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention will be better understood from the detailed description provided below and from the accompanying drawings of various embodiments of the invention. Embodiments of the present invention relate generally to monitoring channels operating on a queue manager. The queue manager may be part of a messaging middleware application, which is described in more detail below. Both the total number of channel instances and instances of each named channel running on a queue manager may be monitored. An alarm may be generated when the total number of channel instances exceeds a threshold value. An alarm may also be generated when the instances of a particular named channel exceed a threshold value for the particular named channel.

Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
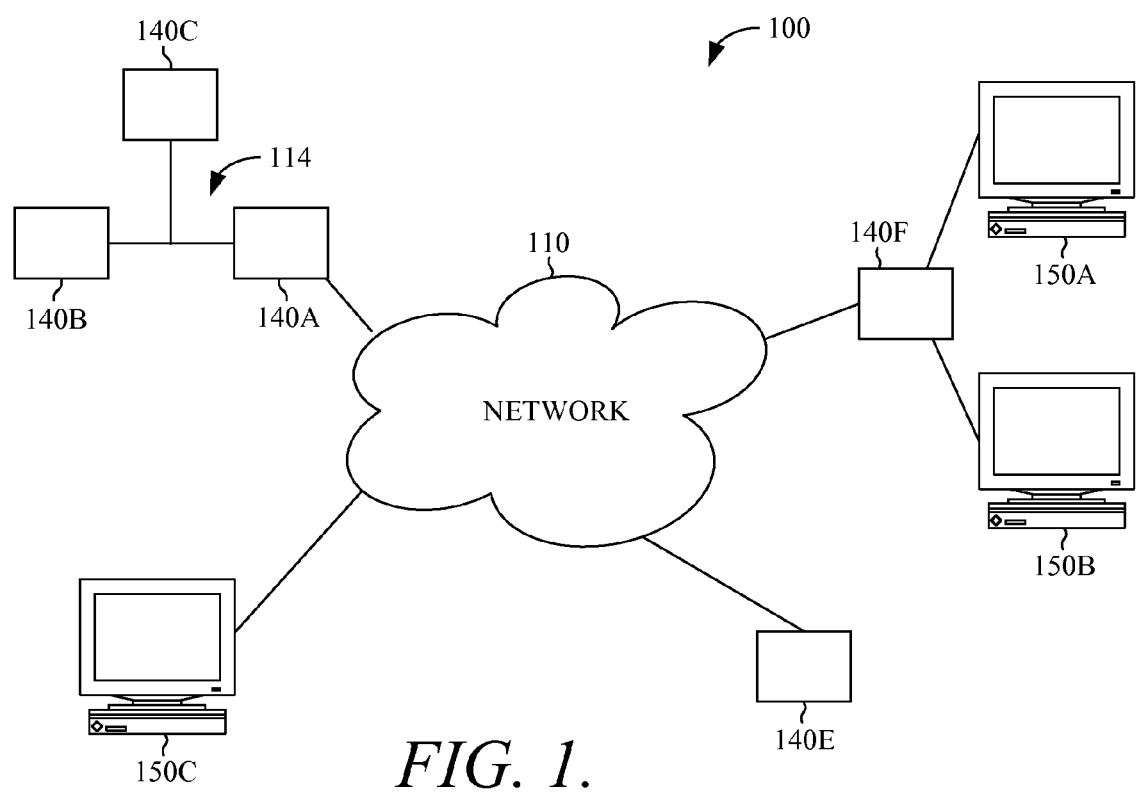
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C which communicate with each other via LAN 114, servers 140E and 140F all of which communicate with each other via network 110. Operating environment 100 is merely an example of one suitable networking environment and is not intended to suggest any limitation as to the scope of use or functionality of embodiments of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
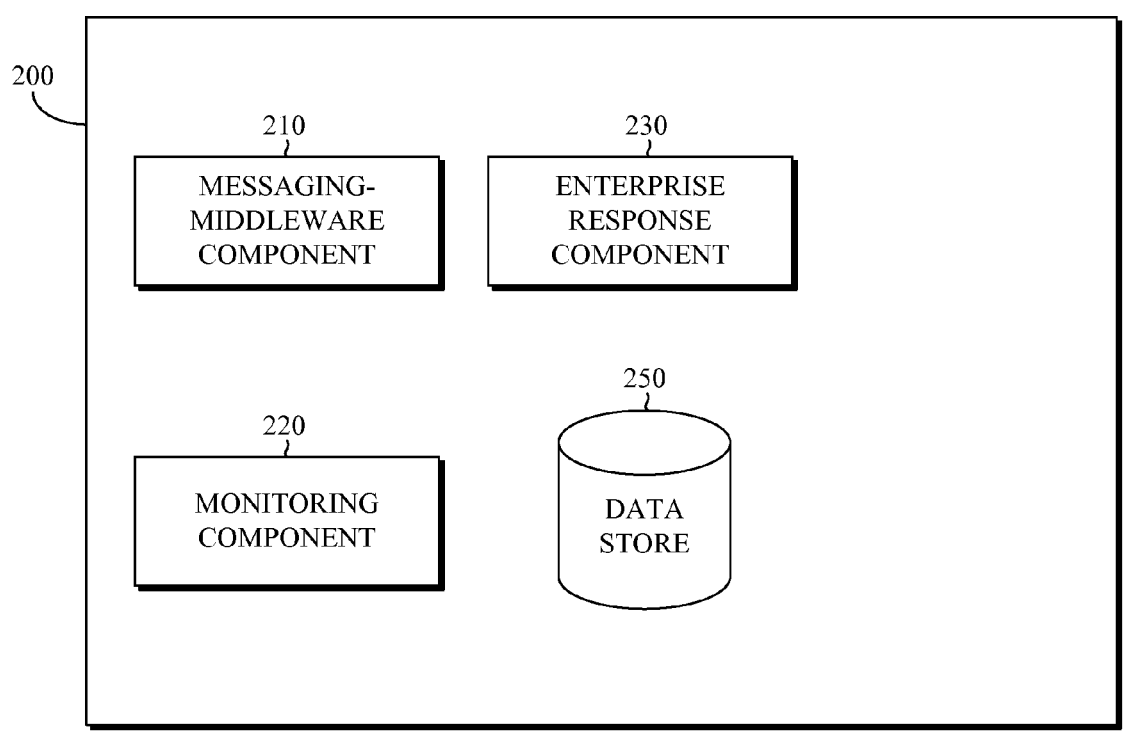
FIG. 2 is a drawing of an operating environment in which an embodiment of the present invention may be practiced.

Turning now to FIG. 2, a block diagram depicts an exemplary computing system architecture 200 suitable for automatically monitoring channels associated with a queue manager. It will be understood and appreciated by those of ordinary skill in the art that the exemplary computing system architecture 200 shown in FIG. 2 is merely an example and is not intended to suggest any limitation as to the scope of the use or functionality of embodiments of the present invention. Neither should the exemplary computing system architecture 200 be interpreted as having any dependency or requirement related to any single component or combination of components illustrated therein.

Exemplary computing system architecture 200 includes a messaging-middleware component 210, a monitoring component 220, an enterprise response component 230, and data store 250. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging middleware applications (a.k.a. message-oriented middleware) include IBM's WebSphere® MQ (formerly MQ Series®), Fiorano's MQ, Oracle Advanced Queuing (AQ), and Microsoft's MSMQ. The messaging-middleware component 210 can be any application that uses queues to transfer messages from one application to another. For example, information from a front-end application is formed into one or more messages. These messages from the front-end application are placed in a sending queue within the messaging-middleware component 210 and transferred into a receiving queue within the messaging-middleware component 210. A back-end program retrieves the message from the receiving queue. The message is transmitted through channels within the messaging-middleware component 210. In this example, the front-end program and the back-end program could be located on any computing device communicatively coupled to the one or more computers on which the messaging-middleware component 210 resides. A messaging-middleware client may reside on both of the computing devices on which the front-end and back-end programs reside to allow interaction with the messaging-middleware component 210.

The messaging-middleware component 210 may manage thousands of queues. In one embodiment, the messaging-middleware component 210 operates in parallel with secondary messaging-middleware components (not shown) containing additional instances of the queues managed by the messaging-middleware component 210. As described previously a queue transfers messages between two programs. Parallel queue instances transfer the same type of message between the same two programs, but are managed by separate messaging-middleware components.

The channels, queues, and queue manager settings within the messaging-middleware component 210 are described by a series of attributes. Each attribute has an associated value or setting. For example, one attribute could be a channel name and the associated setting could be "SprintBillinginfo1." Some attributes are preset, while other attributes measure current conditions within the channel and change over time. For example, the queue name attribute is preset, but the number of channels running on a queue manager changes based on the number of channels currently running.

Monitoring component 220 is configured to monitor messaging-middleware objects (e.g., channels and queues) for upset conditions that may require corrective actions. Examples of commercially available monitoring components include HP Openview®, Q Pasa!® by MQSoftware, Candle's PathWAI, and BMC Patrol. The monitoring component 220 may retrieve, store, and evaluate channel information periodically to ascertain whether an upset condition is present. For example, the number of channels running on a queue manager could be retrieved. Having retrieved one or more attribute values, the one or more attribute values may be evaluated against threshold values within the monitoring component 220. The monitoring component 220 may generate an alarm or incident message if attribute values are outside of normal operating conditions. The monitoring component 220 may perform one or more calculations with the one or more attribute values to arrive at a threshold. For example the monitoring component 220 may calculate the threshold channel instances for a queue manager by multiplying a maximum number of channels a queue manager is configured to run at one time by a percentage to arrive at the threshold. The current number of channels operating may then be compared against a threshold value and an incident message generated if the current number of channels is within a cautionary range. In one embodiment, the percentage is 90%.

The monitoring component 220 is also configured to generate and transmit notifications describing potential problems within a channel. A problem may be indicated when one or more attribute values or calculated values fall outside of a normal operating range. In one embodiment, the information about the potential problem is transmitted to enterprise response component 230. In another embodiment, the monitoring component 220 directly notifies a designated responder about the potential problem.

Enterprise response component 230 is configured to coordinate a response to a problem detected in a channel. The enterprise response component 230 may receive information regarding a malfunction from a monitoring component 220 or another source. Upon receiving notification of a malfunction, the enterprise response component 230 may page a designated responder to investigate the upset condition. A designated responder may be an individual person or group of people given responsibility to fix upset conditions within certain channels. In another embodiment, the designated responder may be a computer application that takes corrective actions.

Figure 3:
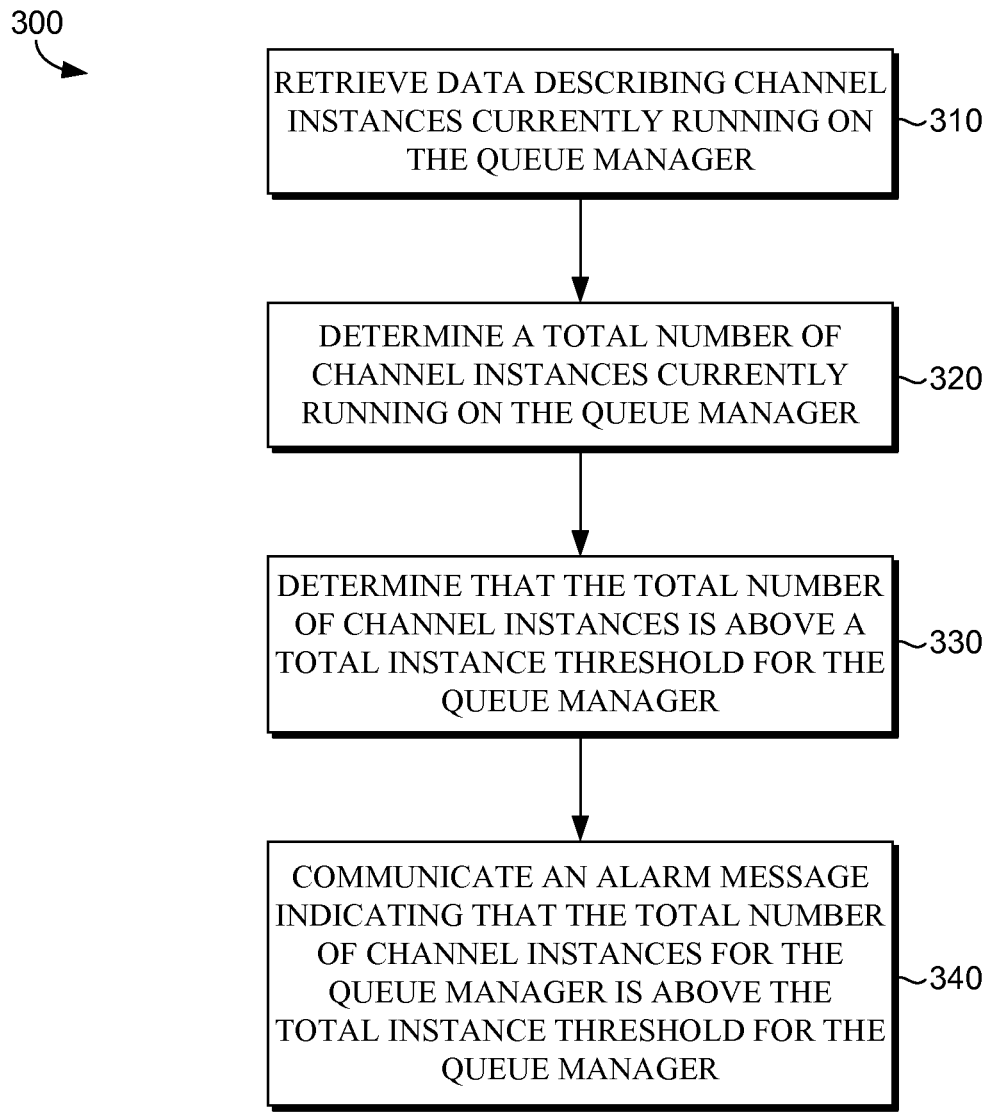
FIG. 3 is a flow diagram in which a method of automatically monitoring channels running on a queue manager is described according to an embodiment of the present invention.

Turning now to FIG. 3, a method 300 of automatically monitoring channels running on a queue manager is described, in accordance with an embodiment of the present invention. The channels referred to in method 300 are logical channels. As described previously, the queue managers may be part of a messaging-middleware application. A messaging-middleware application facilitates the communication of information between two or more applications. The information is communicated between queue mangers in the form of messages that are transmitted over channels. The channels may be unidirectional or bidirectional. Unidirectional channels may be set up in pairs to facilitate two-way communication between queue managers. The channels may be set up automatically by a message channel agent or other component when a queue manager has one or more messages to transmit to a second queue manager. Once established, a channel may be active for a designated period of time before it is automatically deactivated.

At step 310, data describing channel instances currently running on the queue manager is retrieved. In one embodiment, the data is retrieved using a utility function that dumps information describing all instances of channels presently operating on a queue manager. In another embodiment, a particular attribute of the queue manager describes how many channels are currently running. In the embodiment where the information or data lists all channels currently running on the queue manager, the individual channel names may be parsed from the information and counted to determine the total number of channels running on the queue manager. Multiple instances of the same channel, which runs between the same two queue managers, may exist. Each instance may be counted individually to arrive at the total channel count.

At step 320, a total number of channel instances currently running on the queue manager is determined. As described previously, the total number of channels running may be determined by counting the names of each active channel listed in the data retrieved from the queue manager.

At step 330, the total number of channel instances is determined to be above a total instance threshold for the queue manager. The total instance threshold may be a percentage of the maximum channel instances the queue manager is currently configured to run. As part of, or prior to, determining that the total number of channel instances is above a total instance threshold, the total instance threshold may be calculated for the queue manager. The number of channels that the queue manager is configured to run may be retrieved from a main configuration file for the queue manager. For example, a qm.ini file may contain an attribute called "Max Channel" that indicates the maximum number of channels the queue manager is configured to run. This maximum number may be multiplied by a percentage, such as 90%, to calculate a total instance threshold for the queue manager.

At step 340, an alarm message indicating that the total number of channel instances for the queue manager is above the total instance threshold for the queue manager is communicated. In one embodiment, the alarm message is communicated to a person that is responsible for overseeing the queue manager. The communication may be an email, a page, or other mechanism. In another embodiment, the alarm is communicated to an enterprise response component, such as enterprise response component 230 described previously. The enterprise response component would then take whatever actions are needed to communicate the alarm according to procedures established by the system administrators.

Figure 4:
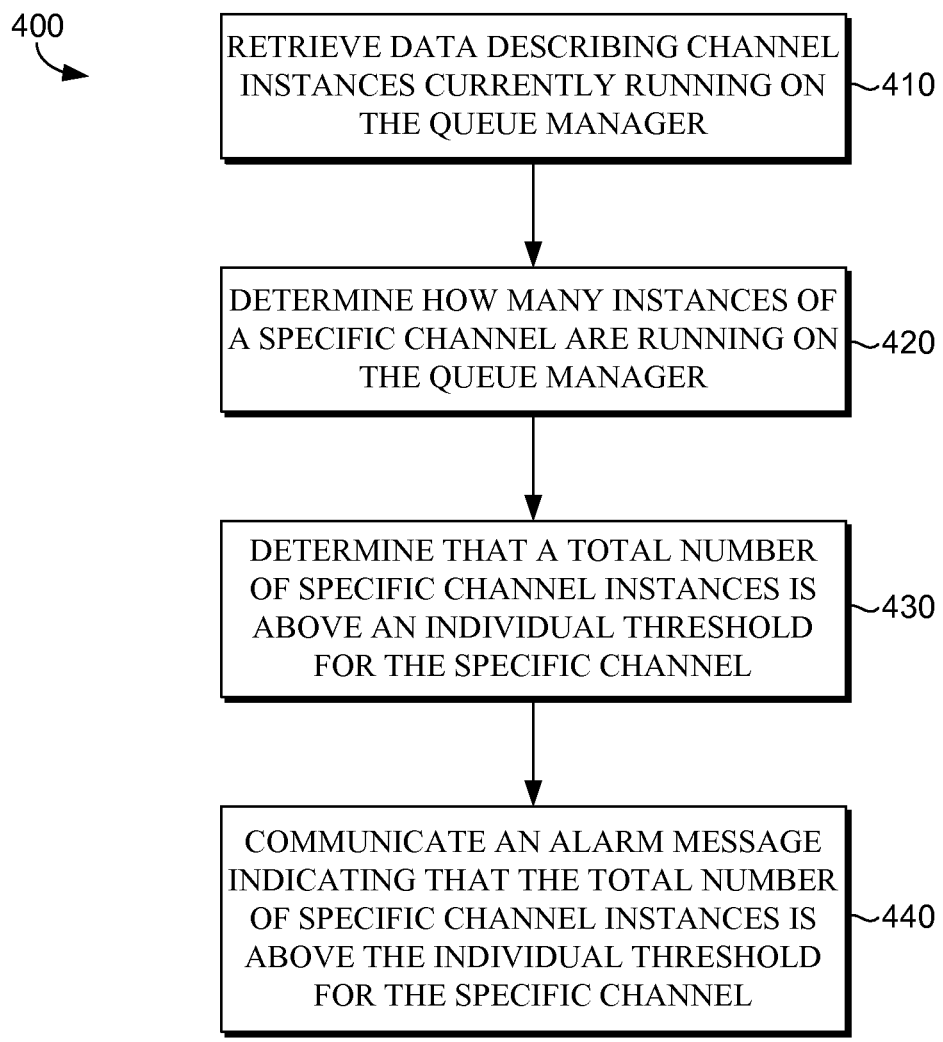
FIG. 4 is a flow diagram in which a method of automatically monitoring channel instances running on a queue manager is described according to an embodiment of the present invention.

Turning now to FIG. 4, a method 400 of automatically monitoring channel instances running on a queue manager is described, in accordance with an embodiment of the present invention. As described previously, the method may run on one or more devices operating or running queue managers as part of a messaging-middleware operation. The channels monitored are logical channels that are used to communicate messages between queue managers. Each queue manager may be responsible for hundreds or even thousands of individual queues to which messages may be sent and received. In some embodiments, multiple instances of the same channel may be simultaneously set up. Instances of the same channel have the same end points and may have the same name. A queue manager may be limited in the total number of channels it is able to run. In addition, a specific instance of a channel may limit the number of identical specific instances that may be active simultaneously.

At step 410, data describing channel instances currently running on the queue manager is retrieved. At step 420, it is determined how many instances of a specific channel are running on the queue manager at the present time. In one embodiment, this determination is made by parsing the names of each specific channel instance running on the queue manager and identifying duplicate channel instance names. A total instance of each channel running may be determined.

At step 430, a total number of specific channel instances are determined to be above an individual threshold for the specific channel. Different channels may have different thresholds. In one embodiment, the individual threshold for the specific channel is determined by multiplying the maximum instances of a channel allowed in the channel's definition by a percentage. For example, if ten instances are allowed in the channel definition, then the threshold for the specific channel may be 80% of the maximum, or eight specific channels. In one embodiment, the actual number of specific channel instances may be derived from data retrieved from the queue manager utility by parsing the names of channels out of the data and counting the channel names.

At step 440, an alarm message indicating that the number of specific channel instances is above the individual threshold for the specific channel is communicated. In one embodiment, the alarm message is communicated to a person that is responsible for overseeing the queue manager. The communication may be an email, a page, or other mechanism. In another embodiment, the alarm is communicated to an enterprise response component, such as enterprise response component 230 described previously. The enterprise response component would then take whatever actions are needed to communicate the alarm according to procedures established by the system administrators.

Figure 5:
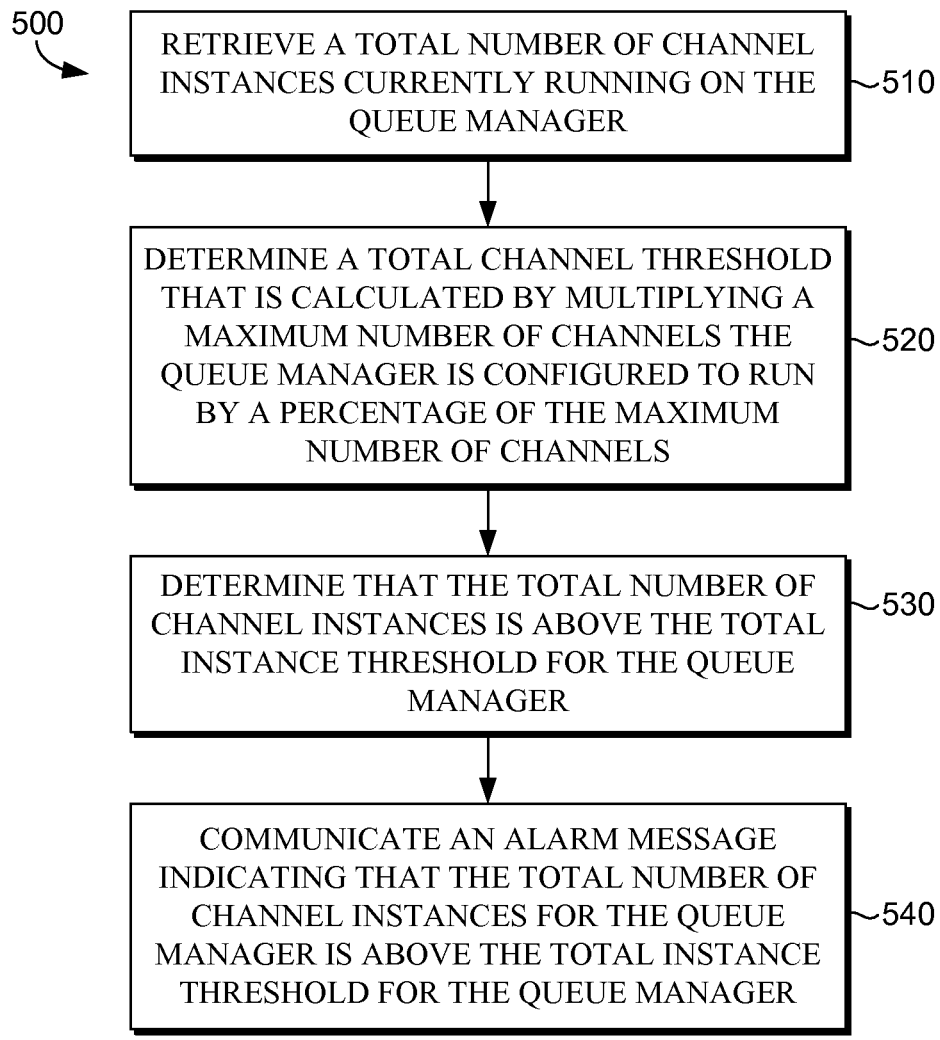
FIG. 5 is a flow diagram in which a method of automatically monitoring channels running on a queue manager is described according to an embodiment of the present invention.

Turning now to FIG. 5, a method 500 of automatically monitoring channels running on a queue manager is described, in accordance with an embodiment of the present invention. As described previously, the method 500 may run on one or more devices operating or running queue managers as part of a messaging-middleware operation. The channels monitored are logical channels that are used to communicate messages between queue managers. At step 510 a total number of channel instances currently running on the queue manager are retrieved. The total number may be retrieved from an attribute value. The total number may also be determined by parsing the names of active channels from data retrieved from the queue manager.

At step 520, a total channel threshold is determined. The total channel threshold is calculated by multiplying a maximum number of channels the queue manager is configured to run by a threshold percentage of the maximum number of channels. As described previously, the maximum number of channels may need to be retrieved from the queue manager's configuration file.

At step 530, the total number of channel instances is determined to be above the total instance threshold for the queue manager. This determination may be made by comparing the total number of channel instances by the total instance threshold. At step 540, an alarm message indicating that the total number of channel instances for the queue manager is above the total instance threshold for the queue manager is communicated. As previously described, the alarm may be communicated to a designated responder or to an enterprise response component having responsibilities for alarms generated in a queue manager.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more non-transitory computer-readable media having computer-executable instructions embodied thereon for performing a method of automatically monitoring channel instances running on a queue manager, the method comprising:
    retrieving data describing channel instances currently running on the queue manager;
    determining a total number of channel instances currently running on the queue manager;
    determining that the total number of channel instances is above a total channel instance threshold for the queue manager wherein the total channel instance threshold is a percentage of a maximum number of channel instances the queue manager is configured to run; and
    communicating an alarm message indicating that the total number of channel instances for the queue manager is above the total channel instance threshold for the queue manager.

2. The one or more non-transitory computer-readable media of claim 1, wherein the method further comprises retrieving an attribute value describing the maximum number of channel instances the queue manager is configured to run.

3. The one or more non-transitory computer-readable media of claim 1, wherein the method further comprises:
    determining how many instances of a specific channel are running on the queue manager;
    determining that a total number of specific channel instances are above an individual threshold for the specific channel; and
    communicating an alarm message indicating that the total number of specific channel instances is above the individual threshold for the specific channel.

4. The one or more non-transitory computer-readable media of claim 3, wherein the method further comprises retrieving a maximum number of instances of the specific channel allowed to run on the queue manager.

5. The one or more non-transitory computer-readable media of claim 4, wherein the individual threshold for the specific channel is a percentage of the maximum number of instances of the specific channel allowed to run on the queue manager.

6. The one or more non-transitory computer-readable media of claim 4, wherein the maximum number of instances of the specific channel is retrieved from an attribute in a definition of the specific channel.

7. One or more non-transitory computer-readable media having computer-executable instructions embodied thereon for performing a method of automatically monitoring channel instances running on a queue manager, the method comprising:
    retrieving data describing channel instances currently running on the queue manager;
    determining how many instances of a specific channel are running on the queue manager;
    determining that a total number of specific channel instances are above an individual threshold for the specific channel, wherein the individual threshold for the specific channel is a percentage of a maximum number of instances of the specific channel allowed to run on the queue manager; and
    communicating an alarm message indicating that the total number of specific channel instances is above the individual threshold for the specific channel.

8. The one or more non-transitory computer-readable media of claim 7, wherein the method further comprises retrieving the maximum number of instances of the specific channel allowed to run on the queue manager.

9. The one or more non-transitory computer-readable media of claim 7, wherein the method further comprises:
    determining a total number of channel instances currently running on the queue manager;
    determining that the total number of channel instances is above a total channel instance threshold for the queue manager; and
    communicating an alarm message indicating that the total number of channel instances for the queue manager is above the total channel instance threshold for the queue manager.

10. The one or more non-transitory computer-readable media of claim 9, wherein the method further comprises retrieving an attribute value describing a maximum number of channel instances the queue manager is configured to run.

11. The one or more non-transitory computer-readable media of claim 10, wherein the total channel instance threshold is a percentage of the maximum number of channel instances the queue manager is configured to run.

12. The one or more non-transitory computer-readable media of claim 9, wherein the alarm message is communicated to a monitoring agent for the queue manager.

13. A method of automatically monitoring channel instances running on a queue manager, the method comprising:

retrieving a total number of channel instances currently running on the queue manager;

determining a total channel instance threshold that is calculated by multiplying a maximum number of channel instances the queue manager is configured to run by a percentage of the maximum number of channel instances;

determining that the total number of channel instances is above the total channel instance threshold for the queue manager; and communicating an alarm message indicating that the total number of channel instances for the queue manager is above the total channel instance threshold for the queue manager.

14. The method of claim 13, wherein the total number of channel instances is retrieved from a configuration file for the queue manager.

15. The method of claim 14, wherein the total number of channel instances is retrieved from a max channel attribute in the configuration file.

16. The method of claim 13, wherein the method further comprises:

retrieving an attribute value indicating how many instances of a specific channel are running on the queue manager;

determining that a total number of specific channel instances are above an individual threshold for the specific channel; and communicating an alarm message indicating that the total number of specific channel instances is above the individual threshold for the specific channel.

17. The method of claim 16, wherein the attribute value is retrieved from a maximum instances attribute in a definition for the specific channel.

18. The method of claim 13, wherein the alarm message is communicated to a monitoring agent for the queue manager.

* * * * *